United States Patent
Yelton

Patent Number: 6,146,066
Date of Patent: Nov. 14, 2000

[54] DUST COLLECTION ROUTER

[76] Inventor: Edwin C. Yelton, Rd. Box 28135, El Jebel, Colo. 81628

[21] Appl. No.: 09/231,376

[22] Filed: Jan. 14, 1999

[51] Int. Cl.[7] .............................. B23C 5/02; B27G 1/00; B23B 47/00

[52] U.S. Cl. ..................... 409/134; 144/252.1; 408/67; 409/135; 409/137; 409/182; 451/451

[58] Field of Search .................................. 409/137, 182, 409/181, 134, 135; 144/252.1, 136.95; 408/97, 710, 241 R, 67; 451/451; 173/75

[56] References Cited

U.S. PATENT DOCUMENTS

| | | | |
|---|---|---|---|
| 1,990,991 | 2/1935 | Heubach | 409/137 |
| 2,343,875 | 3/1944 | Schwartz | 409/137 |
| 2,502,907 | 4/1950 | Welte | 409/137 |
| 2,527,968 | 10/1950 | Sherman et al. | 408/67 |
| 3,339,435 | 9/1967 | Heitz | 409/137 |
| 3,583,821 | 6/1971 | Shaub | 408/72 |
| 4,051,880 | 10/1977 | Hestily | 144/252 R |
| 4,209,069 | 6/1980 | Smith | 173/75 |
| 4,562,872 | 1/1986 | Fushiya et al. | 144/134 D |
| 4,566,830 | 1/1986 | Maier et al. | 409/182 |
| 4,742,855 | 5/1988 | Hartley | 409/137 X |
| 4,909,293 | 3/1990 | Maioli | 408/67 |
| 4,921,375 | 5/1990 | Famulari | 408/67 |
| 5,332,343 | 7/1994 | Watanabe et al. | 409/136 |
| 5,584,620 | 12/1996 | Blickhan et al. | 409/137 |

FOREIGN PATENT DOCUMENTS

| | | | |
|---|---|---|---|
| 3734127 | 4/1989 | Germany | 409/137 |
| 3-98738 | 4/1991 | Japan | 409/137 |

*Primary Examiner*—William Briggs

[57] ABSTRACT

A dust collecting router for collecting dust and debris while using a router. The dust collecting router includes a housing with a passage therethrough with a pair of ends each having an opening into the passage. A motor is mounted in the housing and has a rotating shaft outwardly extending therefrom towards a first end of the housing. A cutting bit is coupled to a free end of the rotating shaft and outwardly extending through the opening of the first end of the housing. An impeller comprising a plurality of fan blades outwardly radiating from the rotating shaft of the motor. A collecting container is in communication with the opening of the second end of the housing.

10 Claims, 2 Drawing Sheets

DUST COLLECTION ROUTER

BACKGROUND OF THE INVENTION

1. Field of the Invention

The present invention relates to router tools and more particularly pertains to a new dust collecting router for collecting dust and debris while using a router.

2. Description of the Prior Art

The use of router tools is known in the prior art. More specifically, router tools heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 4,051,880; U.S. Pat. No. 5,713,785; U.S. Pat. No. 5,503,203; U.S. Pat. No. 4,742,855; U.S. Pat. No. 3,880,047; and U.S. Pat. No. 1,830,151.

While these devices fulfill their respective, particular objectives and requirements, the aforementioned patents do not disclose a new dust collecting router. The inventive device includes a housing with a passage therethrough with a pair of ends each having an opening into the passage. A motor is mounted in the housing and has a rotating shaft outwardly extending therefrom towards a first end of the housing. A cutting bit is coupled to a free end of the rotating shaft and outwardly extending through the opening of the first end of the housing. An impeller comprising a plurality of fan blades outwardly radiating from the rotating shaft of the motor. A collecting container is in communication with the opening of the second end of the housing.

In these respects, the dust collecting router according to the present invention substantially departs from the conventional concepts and designs of the prior art, and in so doing provides an apparatus primarily developed for the purpose of collecting dust and debris while using a router.

SUMMARY OF THE INVENTION

In view of the foregoing disadvantages inherent in the known types of router tools now present in the prior art, the present invention provides a new dust collecting router construction wherein the same can be utilized for collecting dust and debris while using a router.

The general purpose of the present invention, which will be described subsequently in greater detail, is to provide a new dust collecting router apparatus and method which has many of the advantages of the router tools mentioned heretofore and many novel features that result in a new dust collecting router which is not anticipated, rendered obvious, suggested, or even implied by any of the prior art router tools, either alone or in any combination thereof.

To attain this, the present invention generally comprises a housing with a passage therethrough with a pair of ends each having an opening into the passage. A motor is mounted in the housing and has a rotating shaft outwardly extending therefrom towards a first end of the housing. A cutting bit is coupled to a free end of the rotating shaft and outwardly extending through the opening of the first end of the housing. An impeller comprising a plurality of fan blades outwardly radiating from the rotating shaft of the motor. A collecting container is in communication with the opening of the second end of the housing.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new dust collecting router apparatus and method which has many of the advantages of the router tools mentioned heretofore and many novel features that result in a new dust collecting router which is not anticipated, rendered obvious, suggested, or even implied by any of the prior art router tools, either alone or in any combination thereof.

It is another object of the present invention to provide a new dust collecting router which may be easily and efficiently manufactured and marketed.

It is a further object of the present invention to provide a new dust collecting router which is of a durable and reliable construction.

An even further object of the present invention is to provide a new dust collecting router which is susceptible of a low cost of manufacture with regard to both materials and labor, and which accordingly is then susceptible of low prices of sale to the consuming public, thereby making such dust collecting router economically available to the buying public.

Still yet another object of the present invention is to provide a new dust collecting router which provides in the apparatuses and methods of the prior art some of the advantages thereof, while simultaneously overcoming some of the disadvantages normally associated therewith.

Still another object of the present invention is to provide a new dust collecting router for collecting dust and debris while using a router.

Yet another object of the present invention is to provide a new dust collecting router which includes a housing with a passage therethrough with a pair of ends each having an opening into the passage. A motor is mounted in the housing and has a rotating shaft outwardly extending therefrom towards a first end of the housing. A cutting bit is coupled to a free end of the rotating shaft and outwardly extending through the opening of the first end of the housing. An impeller comprising a plurality of fan blades outwardly radiating from the rotating shaft of the motor. A collecting container is in communication with the opening of the second end of the housing.

Still yet another object of the present invention is to provide a new dust collecting router that may easily be held in the hand of a user so that it may be used in a variety of locations.

Even still another object of the present invention is to provide a new dust collecting router that helps reduce dust and debris projected from cutting into an object with a router from getting into the eyes of a user.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
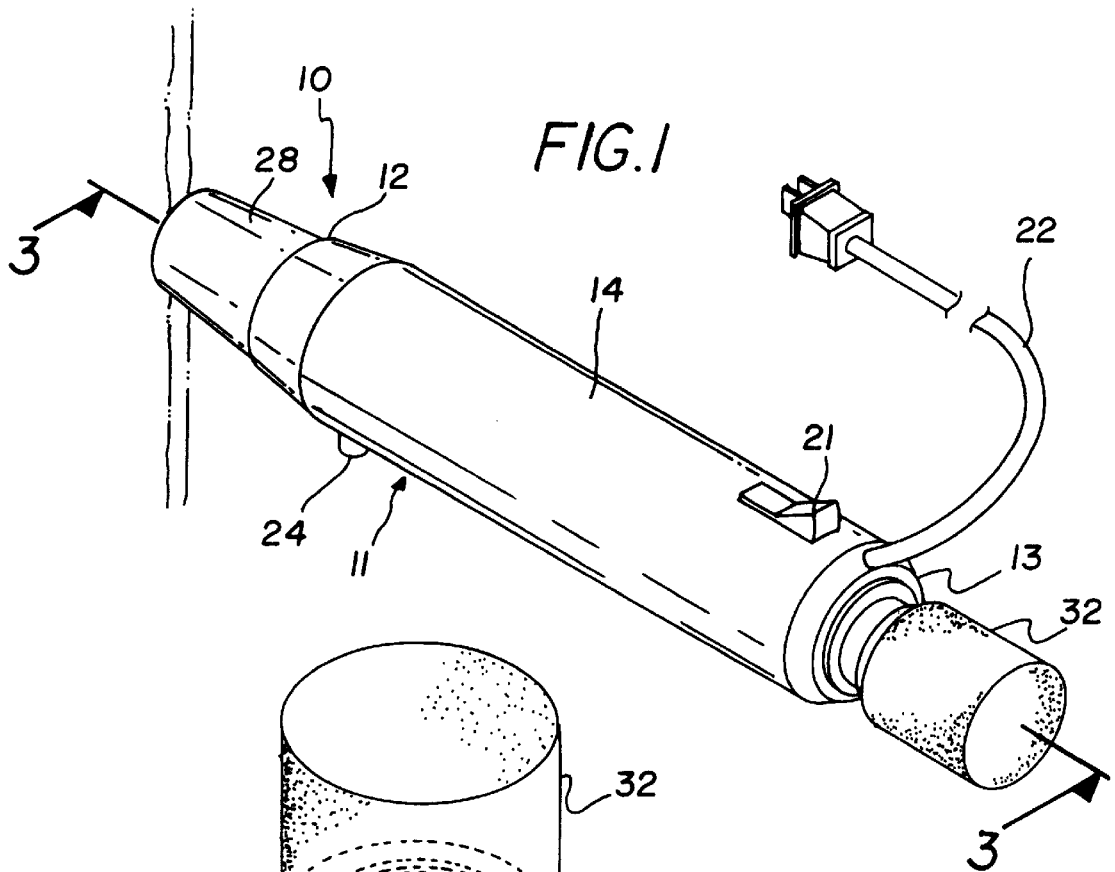
FIG. 1 is a schematic perspective view of a new dust collecting router in use according to the present invention.
Figure 2:
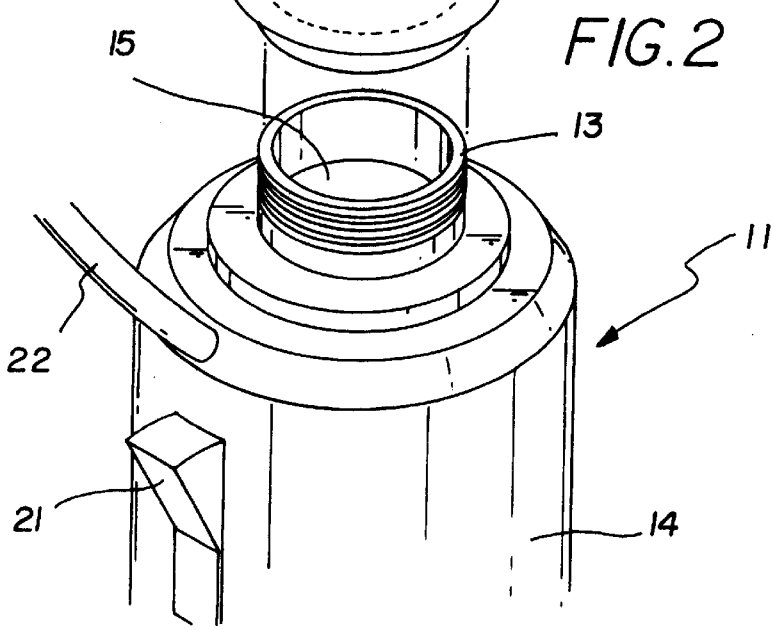
FIG. 2 is a schematic exploded perspective view of the second end region of the present invention.
Figure 3:
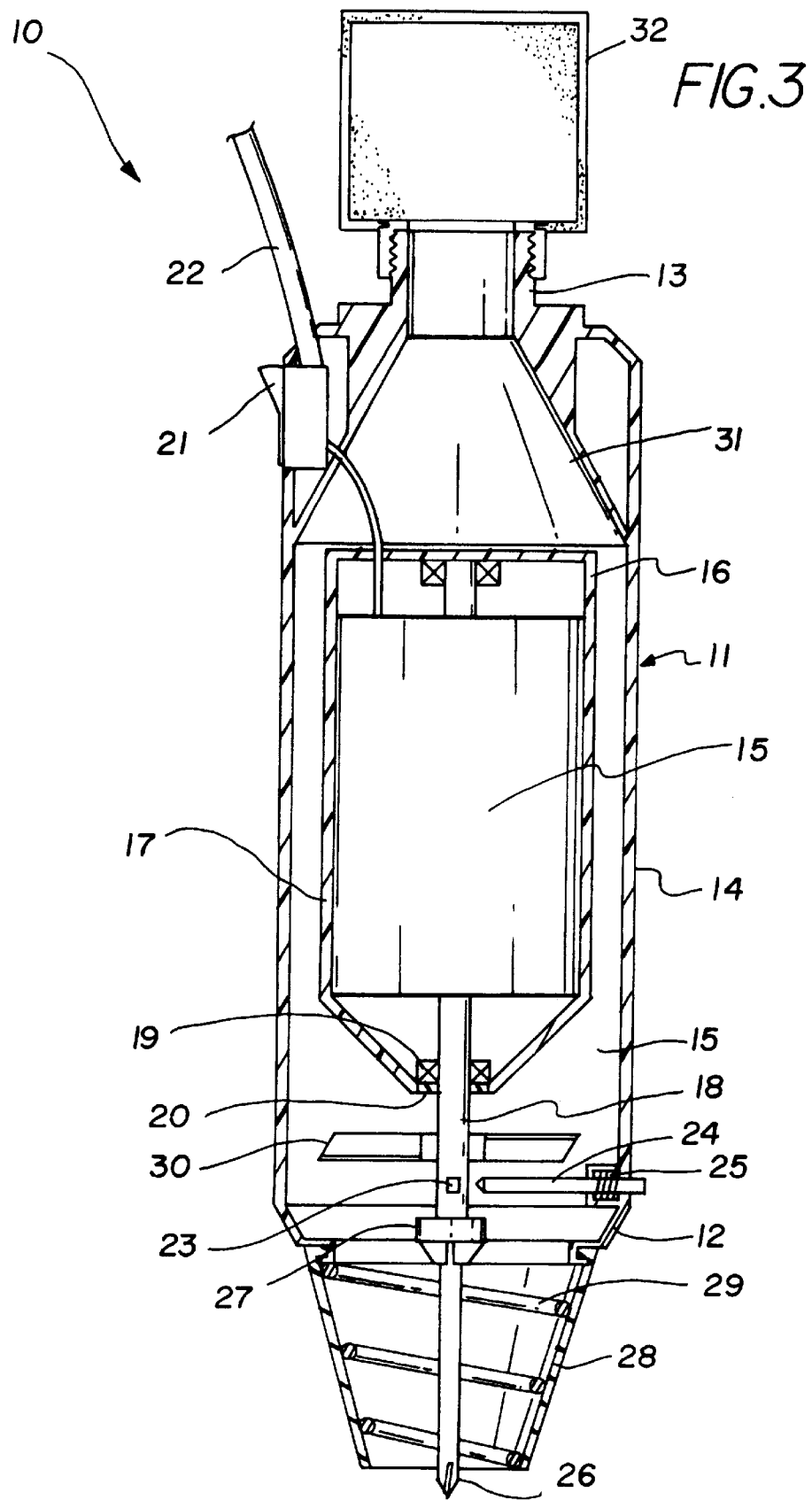
FIG. 3 is a schematic cross sectional view of the present invention taken from line 3—3 of FIG. 1.

With reference now to the drawings, and in particular to FIGS. 1 through 3 thereof, a new dust collecting router embodying the principles and concepts of the present invention and generally designated by the reference numeral 10 will be described.

As best illustrated in FIGS. 1 through 3, the dust collecting router 10 generally comprises a housing with a passage therethrough with a pair of ends each having an opening into the passage. A motor is mounted in the housing and has a rotating shaft outwardly extending therefrom towards a first end of the housing. A cutting bit is coupled to a free end of the rotating shaft and outwardly extending through the opening of the first end of the housing. An impeller comprising a plurality of fan blades outwardly radiating from the rotating shaft of the motor. A collecting container is in communication with the opening of the second end of the housing.

In closer detail, the dust collecting router 10 comprises an elongate generally cylindrical tubular housing 11 having has opposite first and second ends 12,13, a generally cylindrical outer side surface 14, and a longitudinal axis extending between the first and second ends of the housing. The housing has a passage 15 therethrough with each of the ends of the housing having an opening into the passage of the housing.

A motor 16 is mounted in the housing. Preferably, the housing has an inner casing 17 therein enclosing the motor. The motor has a rotating shaft 18 outwardly extending therefrom towards the first end of the housing through the inner casing. Ideally, the inner casing has at least one bearing 19 therein disposed around the rotating shaft. As illustrated in FIG. 3, the inner casing also preferably has a resiliently deformable annular gasket 20 disposed around the rotating shaft of the motor forming a seal between the inner casing and the rotating shaft to prevent dust from passing into the inner casing to reach the motor.

Preferably, the motor has a switch for selectively energizing the motor to rotate the rotating shaft. The switch has an actuator 21 on the outer side surface of the housing. The motor also preferably has an power cord 22 outwardly extending from the housing to permit electrically connecting therewith the motor to an electrical power supply.

Preferably, the rotating shaft of the motor is generally coaxial with the longitudinal axis of the housing. The rotating shaft has a free end at the first end of the housing. Ideally, the rotating shaft has a hole 23 adjacent the free end of the rotating shaft. A locking pin 24 is slidably extended through the housing into the hole of the rotating shaft to hold the rotating shaft against rotation. The locking pin is biased away from the rotating shaft in an outwards direction from the housing. Preferably, the housing has a spring 25 disposed around the locking pin biasing the locking pin away from the rotating shaft in an outwards direction from the housing. The locking pin has an end portion outwardly extending from the outer side surface of the housing adjacent the first end of the housing. In use, the end portion of the locking pin is designed for permitting a user to depress with their thumb or finger the locking pin into the hole of the rotating shaft to releasably hold the rotating shaft against rotation.

An elongate cutting bit 26 is coupled to the free end of the rotating shaft and outwardly extending through the opening of the first end of the housing. Preferably, the rotating shaft has a chuck 27 coupling the cutting bit to the free end of the rotating shaft.

A generally frusto-conical sleeve 28 is extended around the opening of the first end of the housing. The sleeve tapers in a outwards direction from the first end of the housing such that the sleeve form a constriction in front of the opening of the first end of the housing. Preferably, the sleeve is detachably attached to the housing so that the sleeve may be quickly replaced if damaged. The sleeve comprises a resiliently deformable material such as a resiliently deformable rubber or plastic so that when this end of the router is pressed against a surface, the sleeve is deformed. The cutting bit is extended through the sleeve such that a tip of the cutting bit outwardly extends from the sleeve. Preferably, a generally helical coiled spring 29 is disposed in the sleeve around the cutting bit. The spring urges the sleeve in an outwardly direction from the first end of the housing when the sleeve is compressed against an object that is cut into with the cutting bit.

An impeller 30 is provided comprising a plurality of fan blades outwardly radiating from the rotating shaft of the motor. The impeller is positioned in the passage of the housing between the motor and the first end of the housing. In use, rotation of the rotating shaft rotates the impeller to draw air into the passage of the housing via the opening of the first end of the housing and towards the opening of the second end of the housing.

Preferably, the passage of the housing has a generally frustoconical tapered portion 31 adjacent the second end of the housing which tapers in a direction toward the second end of the housing.

A generally cylindrical collecting container 32 is in communication with the opening of the second end of the housing. Preferably, as illustrated in FIGS. 2 and 3, the collecting container is threadedly coupled to the second end of the housing. The collecting container preferably has a plurality of apertures therethrough less than a predetermined size to permit the passage of air therethrough while preventing dust and debris particles in the collecting container from passing through the collecting container. Ideally, the collecting container comprises a resiliently deformable open cell foamed material.

In use, the cutting bit is used to cut material from an object. The impeller draws dust and debris formed by cut material into the passage of the housing via the sleeve and opening of the first end of the housing and blows the drawn in dust and debris out through the opening of the second end into the collecting container where it is collected. The collected debris may emptied from the collecting container by detaching the collecting container from the housing.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A router for woodworking and removing debris caused by woodworking, comprising:
    a housing having opposite first and second ends, an outer side surface;
    said housing having a passage therethrough, each of said ends of said housing having an opening into said passage of said housing;
    a motor being mounted in said housing;
    said motor having a rotating shaft outwardly extending therefrom towards said first end of said housing;
    said rotating shaft having a free end at said first end of said housing;
    a cutting bit being coupled to said free end of said rotating shaft and outwardly extending through said opening of said first end of said housing;
    an impeller comprising a plurality of fan blades outwardly radiating from said rotating shaft of said motor; a collecting container in communication with said opening of said second end of said housing;
    a sleeve being extended around said opening of said first end of said housing and being fixedly mounted on said housing to prevent rotation of said sleeve with respect to said housing;
    wherein said sleeve comprises a resiliently deformable material for adapting to the varying distance to a work surface as the cutting bit is moved into said work surface;
    wherein said sleeve tapers in an inwards direction from said first end of said housing for concentrating a vacuum effect towards a free open end of said sleeve, said cutting bit being extended through said sleeve such that a tip of the cutting bit outwardly extends from said sleeve; and
    wherein a generally helical spring is disposed in said sleeve around said cutting bit for maintaining said sleeve in forced abutment against the work surface as said cutting bit contacts said work surface.

2. The router of claim 1, wherein said housing has an inner casing therein enclosing said motor, and wherein said rotating shaft is extended through said inner casing.

3. The router of claim 1, wherein said rotating shaft has a hole, wherein a locking pin is slidably extended through said housing into said hole of said rotating shaft to hold said rotating shaft against rotation.

4. The router of claim 3, wherein said locking pin is biased away from said rotating shaft in an outwards direction from said housing.

5. The router of claim 4, wherein said housing has a spring disposed around said locking pin biasing said locking pin away from said rotating shaft in an outwards direction from said housing.

6. A router, comprising:
    an elongate generally cylindrical tubular housing having opposite first and second ends, a generally cylindrical outer side surface, and a longitudinal axis extending between said first and second ends of said housing;
    said housing having a passage therethrough, each of said ends of said housing having an opening into said passage of said housing;
    a motor being mounted in said housing;
    said housing having an inner casing therein enclosing said motor;
    said motor having a rotating shaft outwardly extending therefrom towards said first end of said housing through said inner casing;
    said inner casing having a resiliently deformable annular gasket disposed around said rotating shaft of said motor;
    said rotating shaft of said motor being generally coaxial with said longitudinal axis of said housing;
    said rotating shaft having a free end at said first end of said housing;
    said rotating shaft having a hole adjacent said free end of said rotating shaft;
    a locking pin being slidably extended through said housing into said hole of said rotating shaft to hold said rotating shaft against rotation;
    said locking pin being biased away from said rotating shaft in an outwards direction from said housing, wherein said housing has a spring disposed around said locking pin biasing said locking pin away from said rotating shaft in an outwards direction from said housing;
    said locking pin having an end portion outwardly extending from said outer side surface of said housing adjacent said first end of said housing;
    a cutting bit being coupled to said free end of said rotating shaft and outwardly extending through said opening of said first end of said housing;

a generally frusto-conical sleeve being extended around said opening of said first end of said housing, said sleeve tapering in an inwards direction from said first end of said housing;

said sleeve being detachably attached to said housing;

said sleeve comprising a resiliently deformable material;

said cutting bit being extended through said sleeve such that a tip of the cutting bit outwardly extends from said sleeve;

a generally helical spring being disposed in said sleeve around said cutting bit;

an impeller comprising a plurality of fan blades outwardly radiating from said rotating shaft of said motor, said impeller being positioned in said passage of said housing between said motor and said first end of said housing;

said passage of said housing having a generally frusto-conical tapered portion adjacent said second end of said housing, said tapered portion of said passage tapering in a direction toward said second end of said housing, said passage of said housing being between said housing and said inner casing such that the debris is forced by said impeller past said inner casing and into the collecting container; and a generally cylindrical collecting container in communication with said opening of said second end of said housing, said collecting container being threadedly coupled to said second end of said housing, said collecting container having a plurality of apertures therethrough less than a predetermined size to prevent dust and debris particles in said collecting container from passing through said collecting container, wherein said collecting container comprises a resiliently deformable open cell foamed material.

7. The router of claim 1, wherein said sleeve is detachably attached to said housing for facilitating cutting bit replacement.

8. The router of claim 2, wherein said passage of said housing is between said housing and said inner casing such that the debris is forced by said impeller past said inner casing and into the collecting container.

9. The router of claim 1, wherein said passage of said housing has a generally frusto-conical tapered portion adjacent said second end of said housing, said tapered portion of said passage tapering in a direction toward said second end of said housing.

10. The router of claim 1, wherein said collecting container is threadedly coupled to said second end of said housing.

* * * * *